US009633374B2

(12) United States Patent
Ravindran et al.

(10) Patent No.: US 9,633,374 B2
(45) Date of Patent: Apr. 25, 2017

(54) SYSTEM AND METHODS FOR REBROADCASTING OF RADIO ADS OVER OTHER MEDIUMS

(71) Applicants: Binuraj K. Ravindran, Cupertino, CA (US); Sridhar G. Sharma, Milpitas, CA (US)

(72) Inventors: Binuraj K. Ravindran, Cupertino, CA (US); Sridhar G. Sharma, Milpitas, CA (US)

(73) Assignee: INTEL CORPORATION, Santa Clara, CA (US)

( * ) Notice: Subject to any disclaimer, the term of this patent is extended or adjusted under 35 U.S.C. 154(b) by 211 days.

(21) Appl. No.: 13/729,795

(22) Filed: Dec. 28, 2012

(65) Prior Publication Data

US 2014/0188619 A1    Jul. 3, 2014

(51) Int. Cl.

| | |
|---|---|
| *G06Q 30/02* | (2012.01) |
| *H04W 4/00* | (2009.01) |
| *H04W 4/06* | (2009.01) |
| *H04W 4/20* | (2009.01) |
| *H04H 20/02* | (2008.01) |
| *H04H 20/61* | (2008.01) |
| *H04H 60/92* | (2008.01) |

(52) U.S. Cl.
CPC ......... *G06Q 30/0267* (2013.01); *H04H 20/02* (2013.01); *H04H 20/61* (2013.01); *H04H 60/92* (2013.01); *H04W 4/008* (2013.01); *H04W 4/06* (2013.01); *H04W 4/206* (2013.01)

(58) Field of Classification Search
CPC .......... G06Q 30/0267; G06Q 30/0241; G06Q 30/0251

USPC ........................................... 705/14.64, 14.49
See application file for complete search history.

(56) References Cited

U.S. PATENT DOCUMENTS

| | | | | |
|---|---|---|---|---|
| 6,484,148 | B1 * | 11/2002 | Boyd .......................... | 705/14.64 |
| 6,490,432 | B1 * | 12/2002 | Wegener et al. ............ | 455/3.05 |
| 7,187,947 | B1 * | 3/2007 | White et al. ................ | 455/556.1 |
| 8,224,699 | B2 * | 7/2012 | Wald et al. ................. | 705/14.64 |
| 2007/0011700 | A1 * | 1/2007 | Johnson .................... | H04N 7/16 725/34 |
| 2011/0258048 | A1 * | 10/2011 | White et al. ................ | 705/14.64 |

(Continued)

FOREIGN PATENT DOCUMENTS

| | | | |
|---|---|---|---|
| KR | 10-2012-0139325 A | 12/2012 | |
| KR | 0139325 | * 12/2012 | ............ G06Q 30/02 |

OTHER PUBLICATIONS

International Search Report and Written Opinion received for PCT Patent Application No. PCT/US2013/047817 mailed on Sep. 30, 2013, 10 pages.

*Primary Examiner* — David Stoltenberg
*Assistant Examiner* — Robert C Johnson
(74) *Attorney, Agent, or Firm* — Ellis B. Ramirez; Prass LLP (57) ABSTRACT

A method and system for specifying content of interest using a digital radio broadcast receiver is described. A digital radio broadcast signal includes an alternate way of distributing content-rich Advertisements over the digital radio broadcast networks and rebroadcast these Advertisements over technologies like Bluetooth, Wi-Fi and the like to smart devices. A digital out-of-home network system will act as a bridge to relay the received Advertisements to smart devices.

15 Claims, 3 Drawing Sheets

(56) References Cited

U.S. PATENT DOCUMENTS

| | | | |
|---|---|---|---|
| 2012/0101902 A1* | 4/2012 | Bares | G06Q 30/0267 705/14.64 |
| 2012/0233343 A1* | 9/2012 | Tedesco et al. | 709/229 |
| 2012/0296742 A1* | 11/2012 | Patwa et al. | 705/14.54 |
| 2012/0303442 A1* | 11/2012 | Patwa | G06F 17/30905 705/14.41 |

* cited by examiner

SYSTEM AND METHODS FOR REBROADCASTING OF RADIO ADS OVER OTHER MEDIUMS

FIELD OF THE DISCLOSED EMBODIMENTS

The present invention relates, generally, to communication networks, and in particular to a system and method for media content distribution for digital out-of-home networks and applications, and more particularly to receiving advertisement content over digital radio broadcast and rebroadcasting using a short-range wireless communication protocol.

INTRODUCTION

Digital out-of-home (DOOH) networks and electronic signs are a dynamic media solution to help marketers target messages to a specific audience. This form of media communication allows advertising (Ad) and other information to be delivered to narrow demographic groups at specific times in public venues. Examples of narrowcasting in public spaces include delivering pricing and promotional messages to shoppers in department stores or supermarkets, delivering appropriate advertising (Ad) and news to commuters at airports, in train stations, on buses, in elevators, or highlighting special offers to customers at retail settings. These and other examples of digital signage can be characterized generally into segments: point of purchase, visual merchandising, and display of content.

Some of these DOOH systems offer features where the users can get additional information about a product, retrieve coupons and other offers interactively using technologies like short messaging service (SMS), Bluetooth, Wi-Fi, QR Code and the like. This is a very effective model as more and more people have access to smart devices, which have these technologies (Bluetooth, Wi-Fi, and the like) integrated.

One of the biggest problems with current digital signage or DOOH networks is the investment of both financial resources and time to install the network infrastructure to support the underlying product. Most current digital signage technologies require the establishment of a local area network (LAN) based network. Setting up such a LAN-based network requires extensive capital for both the installation and maintenance of the network itself (cabling, routing, access points, and the like) and the supporting server-based infrastructure. Even with the needed capital, many prime digital signage locations are not conducive to the installation of such items.

Digital broadcasting technology advertisement (Ad) has suffered because of Ad-skipping technologies and Digital Video Recorders (DVRs) have significantly reduced the effectiveness of distributing Ads over the broadcast mediums. This has been reported by multiple marketing studies. Broadcasters and advertisers are looking for alternate and more effective mediums for getting the attention of the potential customers. On the other hand, the advertising in the radio broadcasting has been limited to only audio Ads and these Ads are out of reach from a growing number of users of smart phones, which have built-in Bluetooth, Wi-Fi and other connectivity options.

For the reasons stated above, and for other reasons stated below which will become apparent to those skilled in the art upon reading and understanding the present specification, there is a need in the art for a solution that would provide the best of digital radio broadcasting technology advertisement and digital out-of-home (DOOH) network advertisement.

DETAILED DESCRIPTION OF THE DISCLOSED EMBODIMENTS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Although embodiments of the invention are not limited in this regard, discussions utilizing terms such as, for example, "processing," "computing," "calculating," "determining," "applying," "receiving," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of resistors" may include two or more resistors.

As used herein, digital radio broadcasting (DRB) includes the transmission of one or more programs in a single digital radio broadcasting channel or on a single digital radio broadcasting signal. DRB content can include a main program service (MPS), supplemental program services (SPS), advertisement content, program service data (PSD) and/or other broadcast data. Digital radio broadcasting technology delivers digital audio and data services to mobile, portable, and fixed receivers. One type of digital radio broadcasting, referred to as in-band on-channel (IBOC) digital audio broadcasting (DAB), uses transmitters in the existing Medium Frequency (MF), Short Wave (SW), Amplitude Modulation (AM), Frequency Modulation (FM), and Very High Frequency (VHF) radio bands. The other types of digital radio broadcasting may be Digital Audio Broadcasting (DAB) or Digital Radio Mondiale (DRM) which are more popular in European Counties and Australia. It is also applicable to satellite radio which is broadcast over S and L Band.

Figure 1:
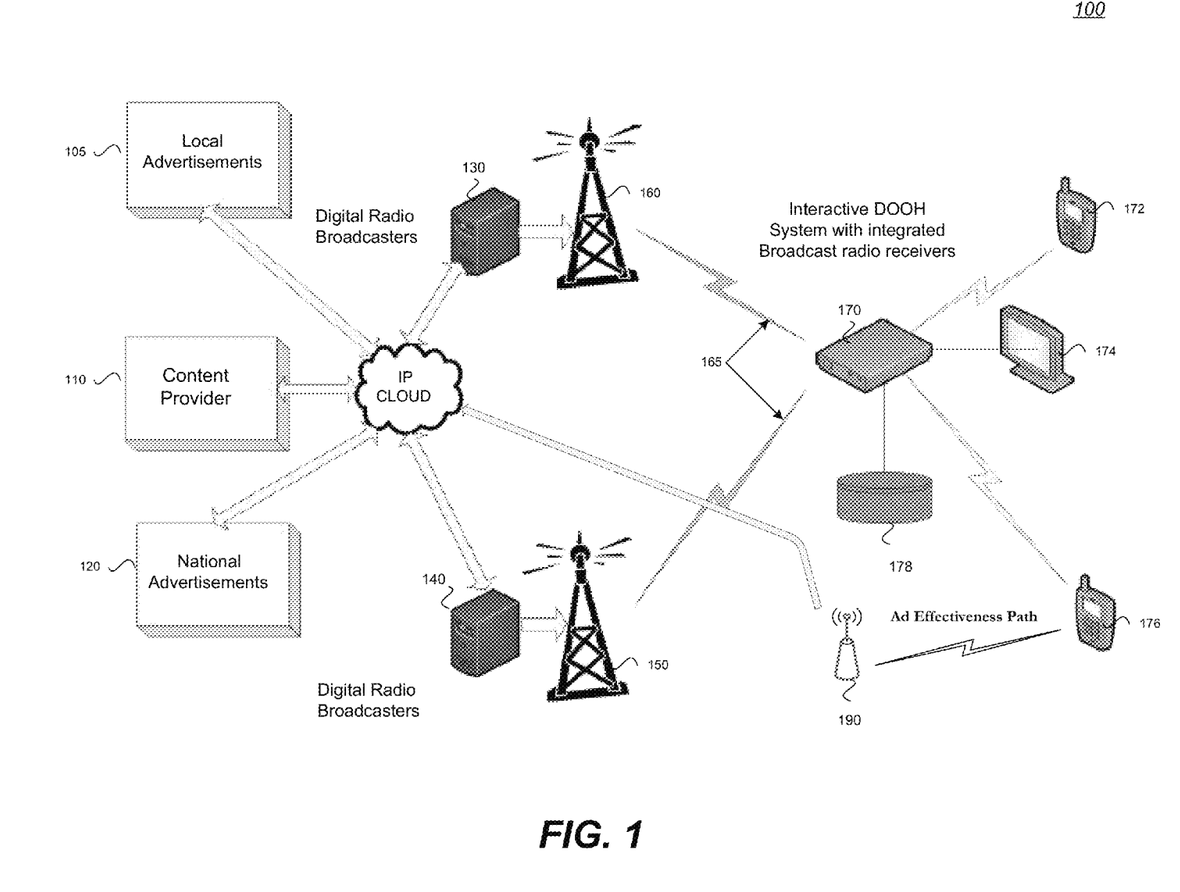
FIG. 1 illustrates a system of broadcasting advertisements to digital out-of-home systems in accordance to an embodiment.

FIG. 1 illustrates a media and content distribution system 100 to broadcast advertisements to digital out-of-home systems in accordance to an embodiment. The integration of digital broadcast radio networks with DOOH systems offer cost-savings, scalability and broader reach compared to traditional radio advertisement systems which tend to be passive and limited in content. The media and content distribution system 100 generally comprises content production, content transmission with digital radio, content rebroadcasting to mobile devices.

Content production comprises various content sources such as local advertisements 105, content provider 110, and national advertisements 120. The content providers can comprise various client computers such as a conventional desktop PC, a computer workstation, or other suitable operator interface devices and can be located in any convenient place. An operator terminal can provide a content programming user interface allowing a content provider to directly schedule and upload content to be transmitted by a broadcaster such as digital radio broadcaster (DRB) 130 or digital radio broadcaster (DRB) 140. DRB 130 and DRB 140 are connected to the content providers over a communication network (IP cloud 125) such as the wireline (public switched telephone system (PSTN), Ethernet connection on a local area network, electrical connection to a personal computer, and the like), fiber or wireless network. It shall be understood that communications between the DRBs, content providers and servers related thereto can be achieved over a variety of wireless networks that provide wireless broadband Internet service including but not limited to satellite Internet, cellular Internet, Wi-Fi and WiMax or other standard implemented wireless networks. The content is then assembled into broadcast signals that can include content information or metadata, such as the artist, song tide, or station call letters. Special messages about events, traffic, and weather can also be included. For example, traffic information, weather forecasts, news, and sports scores can all be combined at DOOH 170 or at a DRB location with advertisement content to be rendered at a mobile device while the user is experiencing the content. The broadcast signals are transmitted by either antenna 160 or antenna 150. Advertisement content distribution over the digital radio broadcast networks offers a very cost-effective way of delivering the content to a large group of targeted audience. The installation of the DRB receiver is very easy as what is needed is a power source and broadcast radio coverage since DOOH 170 only needs to listen for the advertisement. Because of the very nature of radio broadcasting, the infrastructure cost does not increase as the number of devices increases, i.e., a single antenna can serve many devices. Hence the solution is easily scalable. In addition to this, the distribution over the broadcast network does not incur a recurring cost as when using a cellular network. The big advantage is that these DRB systems have a wide footprint because of the lower frequencies used, which have better propagation characteristics, compared to cellular systems. DRB is based on broadcast and as a consequence scales much better than a unicast system in terms of coverage, scalability and ease of deployment in remote areas.

In content transmission with digital radio the content from content providers, digital radio broadcasters (130, 140) using antenna 150 or antenna 160 transmits an in-band on-channel digital radio broadcast (IBOC DAB) signal 165 to a user such as DOOH system 170. Digital radio broadcasting signal (signal 165) can include at least one or more logical channels which are used for the transport of audio and bulk data. These logical channels for bulk data transport are transmitted on the same frequency spectrum that is used for normal audio programming on HD broadcast and FM broadcast channels. The bulk data transport may not be related to the main audio content. These logical channels may also be employed for signaling purposes such as management messages, advertisements, or program guides, for example. Radio transmission (signal 165) bandwidth can be provisioned such that the bandwidth for advertising content can be increased at night when some music channels in some stations go off the air and reduced, if needed, during the day when bandwidth has to be shared with music and the like. The format of data transmitted in the logical channel used for advertising may be proprietary and may be encrypted by the system operator.

While shown as terrestrial antenna 150 and antenna 160, the transmission station can be a direct broadcast satellite, or any other transmission facility capable of transmitting a digital radio broadcast. The user is any entity equipped with a receiver capable of processing a digital radio broadcast. Depending on the portability of the user's digital radio receiver, the user may be located in a building, an automobile, or any other location.

DOOH 170 can operate the receiver so that it can listen to digital radio broadcasts at a particular channel or to a collection of channels. In addition, the DOOH can also download the content of the digital radio broadcast to a local storage device such as content repository 178 so that the DOOH 170 can capture the content of the digital radio broadcast. As noted earlier, this content may be audio or video or both. Video includes video, image or other visual data. Examples of possible content include music, music videos, multimedia presentations, images, text, graphs, news, stock market information, advertisements, traffic information, talk shows and other audio and/or video material. The audio and/or video content may be coded in any format suitable for digital radio transmission. DOOH 170 strips the advertisement content received in the digital radio signal and re-processed to a format suitable for wireless communication to be reproduced at the smart devices like smart phone 172, display 174, or portable device 176. An advertiser can directly reach the individual with a DRB receiver. Hence a subset of advertisements can be targeted to a DOOH system and to a stand-alone DRB receiver increasing the reach of the advertisements, when DRB receivers are integrated with Mobile Devices. In the case where the user does not have access to DRB receiver or is not able to receive DRB content or the content was delivered when the users device was not active then a short range wireless technology can be used to transmit content from DOOH system to the user's device The advertisement effectiveness can be measured over the return channel, such as through access point 190, available through the connectivity in the smart devices. DOOH 170 can wirelessly communicate with physically proximate mobile devices using a short-range wireless protocol, such as an IEEE 802.11 protocol, Bluetooth, IEEE 802.15 protocol, WIFI, or a Short Message Service (SMS).

Figure 2:
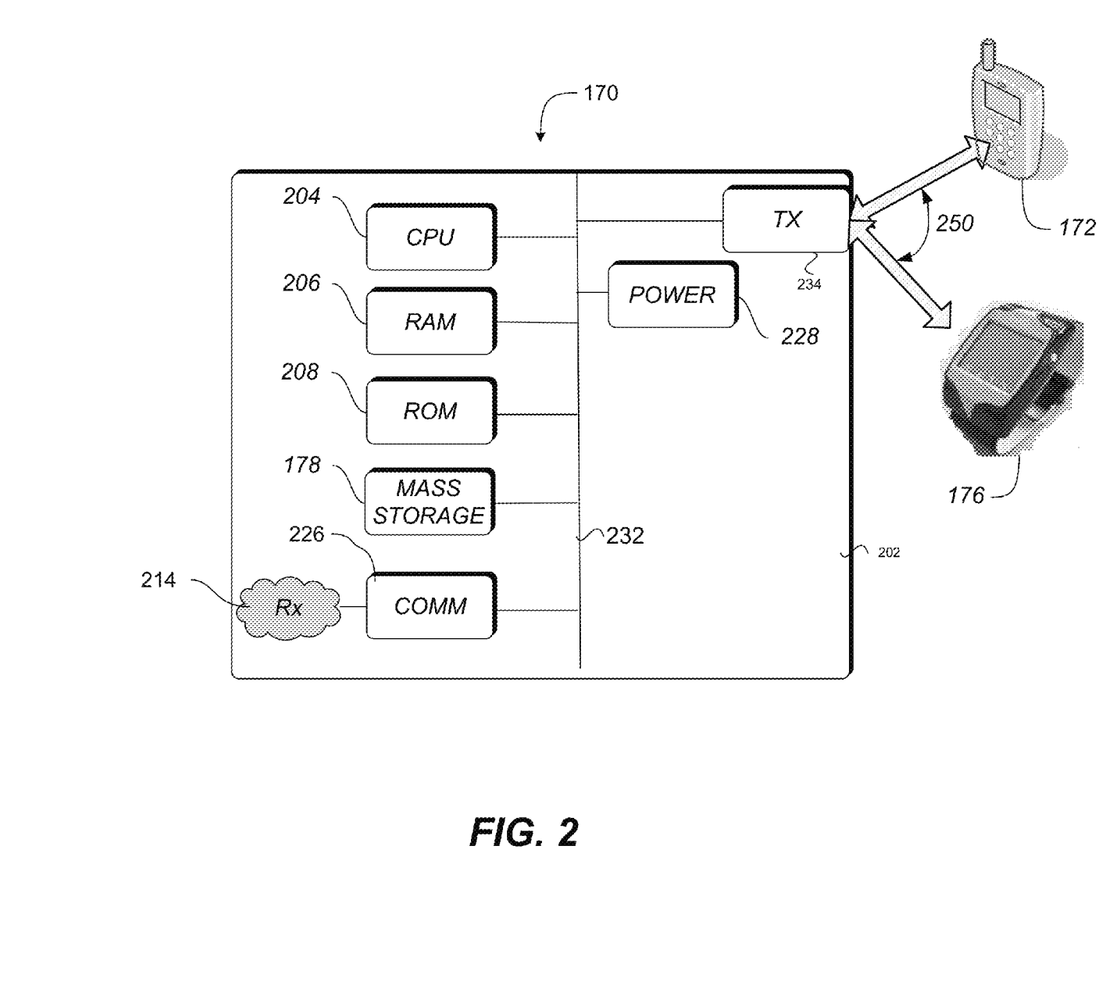
FIG. 2 is a block diagram of a digital out-of-home system with transmitter to rebroadcast to smart devices in accordance to an embodiment.

FIG. 2 is a block diagram of a digital out-of-home system 170 with transmitter to rebroadcast to smart devices in accordance to an embodiment. The description of FIG. 2 provides an overview of computer hardware and a suitable computing environment in conjunction with which some embodiments can be implemented. Embodiments are described in terms of a computer executing computer-executable instructions. In the present arrangement the digital out-of-home (DOOH) system 170 uses communication resources to receive and relay advertising content to outside devices such as smart device 172. The exemplary DOOH system 170 may include a bus 232, a processor 202, a memory 206, a read only memory (ROM) 208, a mass storage device such as repository 178 and other devices to allow instructions to be received by the DOOH system 170 like an input device, an output device, and a communication interface. Bus 232 may permit communication among the components of the DOOH system.

DOOH system 170 includes a processor 204, commercially available from Intel, Motorola, AMD, and others. DOOH system 170 also includes random-access memory (RAM) 206, read-only memory (ROM) 208, and one or more mass storage devices 178, and a system bus 232, that operatively couples various system components to the processing unit 204. The memory 206, 208, and mass storage devices 178 are types of computer-accessible media. Mass storage devices 178 are more specifically types of nonvolatile computer-accessible media and can include one or more hard disk drives, floppy disk drives, flash drives, optical disk drives, and tape cartridge drives. The processor 204 executes computer programs stored on the computer-accessible media. DOOH system 170 also includes power supply 238. Each power supply can be a battery or energy cell. A user enters commands and information into the DOOH system 170 through input devices (not shown) such as a keyboard or a pointing device. Additionally, DOOH system 170 is optionally coupled to a display device. Display device would be connected to the system bus 232. Display device permits the display of information, including computer, video and other information, for viewing by a user of DOOH system 170. In addition to a monitor, DOOH systems may typically include other peripheral input/output devices such as printers (not shown). Speakers (mot shown) provide audio output of signals.

The processor 204 in cooperation with a communication device 226 uses a digital radio broadcast (DRB) receiver 214 to receive a digital radio broadcast (DRB) signal. DRB receiver 214 connectivity is well known within the radio art, which is typically UART (Universal Asynchronous Receiver/Transmitter), SPI (Serial Peripheral Interface), I2C (Inter-Integrated Circuit), USB (Universal Serial Bus) and the like. Communication device 234 is a communication channel from the DOOH system 170 to the mobile devices over a short range wireless technology such as Bluetooth and 802.11.

DOOH system 170 is not limited to any type of computer. In varying embodiments, DOOH system 170 comprises a PC-compatible computer, a MacOS®-compatible computer, a Linux®-compatible computer, or a UNIX®-compatible computer. The construction and operation of such computers are well known within the art.

DOOH system 170 can be operated using at least one operating system to provide a graphical user interface (GUI) including a user-controllable pointer. Computer 302 can have at least one web browser application program executing within at least one operating system, to permit users of DOOH system 170 to access an intranet, extranet or Internet world-wide-web pages as addressed by Universal Resource Locator (URL) addresses. Examples of browser application programs include Netscape Navigator® and Microsoft Internet Explorer®.

DOOH system relays part of the received content through transmitter 234 as indicated by link 250. In some embodiments, such a link is facilitated by information, such as a device address, regarding the mobile device that is stored in a storage device at DOOH system 170. Alternatively, such information can be received along with the mobile device identification code when device is read. Regardless, the DOOH system 170 can then wirelessly transmits the content to the mobile device, as indicated in transmitter 234. Because the mobile device is physically proximate to the DOOH system, short-range wireless communication protocols can be used to transmit the content. For example, the content can be transmitted using an IEEE 802.11 protocol ("Wi-Fi"), Bluetooth, an IEEE 802.15 protocol, or an SMS protocol. Therefore, a telephony or Internet functionality of the mobile device need not be used to receive the content.

Figure 3:
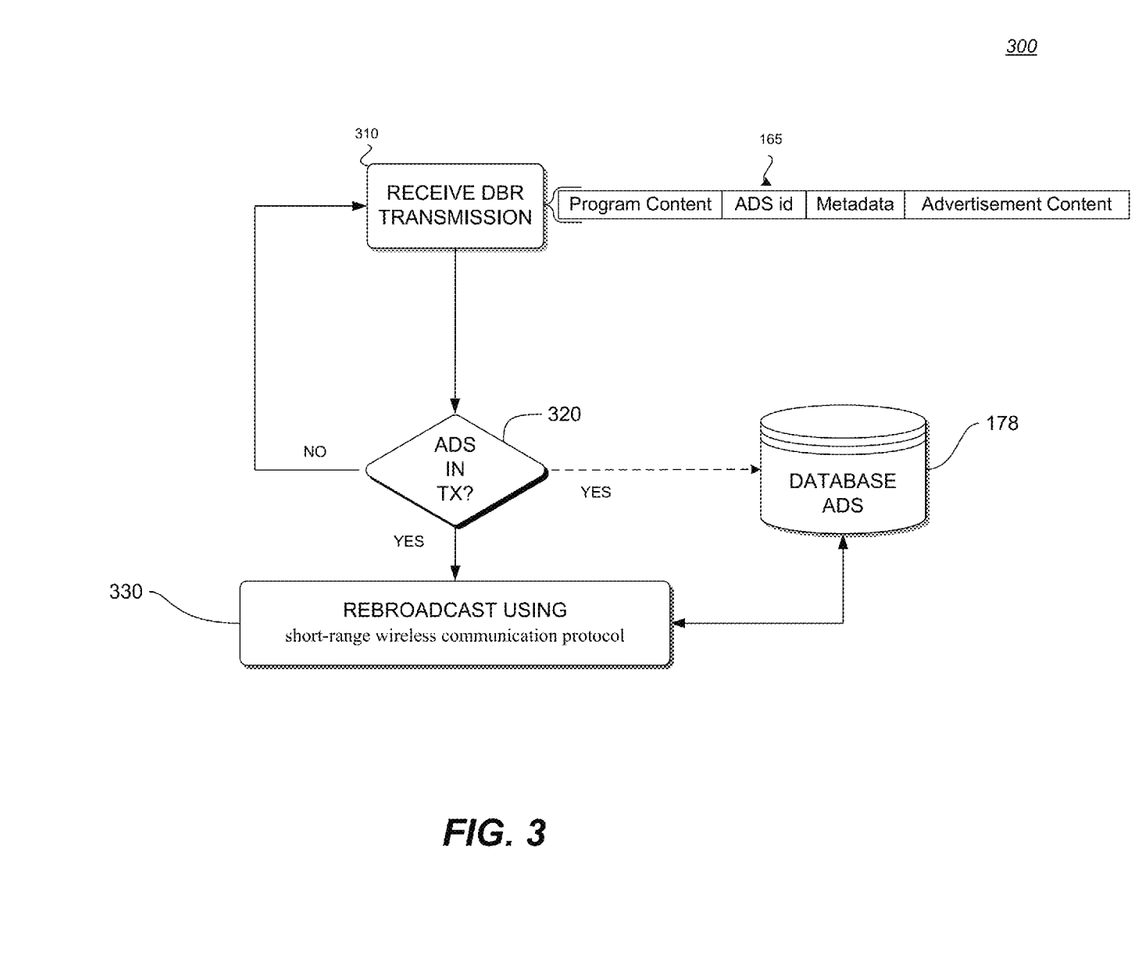
FIG. 3 is a flowchart of a method for digital radio broadcasting to smart devices advertising in accordance to an embodiment.

FIG. 3 is a flowchart of a method for receiving digital radio broadcasting and relaying advertisements other contents to smart devices in accordance to an embodiment. Method 300 covers the actions of a Digital Out Of Home (DOOH) system or Digital Signage system so it can relay received information like advertisements and coupons over a broadcast signal, such as digital radio, to a smart phone device and using the connectivity of the smart device (internet or WIFI) to provide measurability on the effectiveness of the advertisement. Method 300 begins with action 310 where DOOH system 170 receives a DRB transmission such as digital radio broadcast signal 165. The digital radio broadcast signal 165 comprises program content and advertisement content. The content has identification information like an id or metadata that helps distinguish between content. The metadata may also have information relating to the triggering event or parameters needed by the DOOH system to interpret the triggering event like delay for "X" hours or "play-back-time". In action 320, DOOH system 170 identifies and removes/strips from the received content any advertisement that is addressed or directed to the particular digital out-of-home system. If no advertisement content is identified the system continues to process the received DRB transmission for advertisement content. If advertisement content is identified then advertisement is saved in repository 178 for future rebroadcast or forwarded to action 330 for further processing. Future rebroadcast can be delayed until an occurrence of a triggering event such as a particular date, a time range like any time after 6 PM but before midnight, time, day of the week, time of day like AM or PM, or a combination thereof. Since the DOOH system store content it make possible to use the digital radio bandwidth for bulk transport of advertisement content/data during nights and this content can be sequenced by DOOH to play at a later point in time based on time triggers (event) in the metadata. In action 330, the DOOH system rebroadcasts the received digital radio broadcast signal 165 in a format suitable to short-range wireless communication.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that performs particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the disclosure are part of the scope of this disclosure. For example, the principles of the disclosure may be applied to each individual user where each user may individually deploy such a system. This enables each user to utilize the benefits of the disclosure even if any one of the large number of possible applications do not need the functionality described herein. In other words, there may be multiple instances of the components each processing the content in various possible ways. It does not necessarily need to be one system used by all end users. Accordingly, the appended claims and their legal equivalents should only define the disclosure, rather than any specific examples given.

We claim:

1. A method to distribute content, the method comprising:
receiving at a digital out-of-home system (DOOH) a digital radio broadcast signal, wherein the digital radio broadcast signal comprises program content, advertising content, and identification information;
processing the received digital radio broadcast signal using a processor at the DOOH to determine whether there is identification information;
when there is identification information and if the identification information contains a triggering event signal addressed to the DOOH, then stripping from the digital radio broadcast signal content that the DOOH can broadcast to other devices;
based on the determining by the processor, broadcasting the content or storing the content for future broadcasting, wherein the content is advertising content; and
wherein the broadcasting is using a short-range wireless communication protocol communication channel at the DOOH to broadcast the advertising content to at least one mobile device;
wherein the broadcasting or rebroadcasting by the DOOH is in a format suitable to short-range wireless communication;
wherein rebroadcasting comprises wirelessly transmitting text and graphics to the mobile device;
wherein rebroadcasting comprises wirelessly transmitting audio and video to the mobile device;
wherein the rebroadcasting of the advertising content is delayed until an occurrence of a date or time triggering event.

2. The method in accordance to claim 1, wherein the identifying information is at least one of metadata or identification tag to identify the advertising content to enable targeted advertisements.

3. The method of claim 1, wherein rebroadcasting comprises wirelessly transmitting in accordance with an IEEE 802.11 standard.

4. The method of claim 1, wherein rebroadcasting comprises wirelessly transmitting in accordance with a Bluetooth standard.

5. The method of claim 1, wherein rebroadcasting comprises wirelessly transmitting in accordance with an IEEE 802.15 standard.

6. An apparatus comprising:
a digital signage system having at least one transceiver and processor coupled to a storage device having a set of instructions, wherein the set of instructions causes the digital signage system to:
receive a digital radio broadcast signal, the digital radio broadcast signal comprising program content, advertising content, and identification information;
processing the received digital radio broadcast signal using the processor to determine whether there is identification information;
when there is identification information and if the identification information contains a triggering event signal addressed to the digital signage system, then stripping from the digital radio broadcast signal content that the digital signage system can broadcast to other devices; and
based on the determining by the processor, broadcasting the content or storing the content for future broadcasting, wherein the content is advertising content;
wherein the broadcasting is using a short-range wireless communication protocol communication channel to broadcast the advertising content to at least one mobile device;
wherein the broadcasting or rebroadcasting by the digital signage system is in a format suitable to short-range wireless communication;
wherein rebroadcasting comprises wirelessly transmitting text and graphics to the mobile device;
wherein rebroadcasting comprises wirelessly transmitting audio and video to the mobile device;
wherein the rebroadcasting of the advertising content is delayed until an occurrence of a date or time triggering event.

7. The apparatus in accordance to claim 6, wherein the identifying information is at least one of metadata or identification tag to identify the advertising content to enable targeted advertisements.

8. The apparatus of claim 6, wherein a rebroadcast is wirelessly transmitting in accordance with an IEEE 802.11 standard.

9. The apparatus of claim 6, wherein a rebroadcast is wirelessly transmitting in accordance with a Bluetooth standard.

10. The apparatus of claim 6, wherein a rebroadcast is wirelessly transmitting in accordance with an IEEE 802.15 standard.

11. A computer readable non-transitory medium encoded with computer executable instructions, which when accessed, cause a machine to perform operations comprising:

controlling a transceiver at a digital signage system to perform receiving a digital radio broadcast signal comprising program content, advertising content, and identification information; processing the received digital radio broadcast signal using a processor to determine whether there is identification information, when there is identification information and if the identification information contains a triggering event signal addressed to the digital signage system, then stripping from the digital radio broadcast signal content that the digital signage system can broadcast to other devices, then processing with the processor the content for broadcasting or storing of the content for future broadcasting, wherein the content is advertising content; and broadcasting with a short-range wireless communication protocol communication channel the content to at least one mobile device;

wherein the broadcasting or rebroadcasting by the digital signage system is in a format suitable to short-range wireless communication;

wherein rebroadcasting comprises wirelessly transmitting text and graphics to the mobile device;

wherein rebroadcasting comprises wirelessly transmitting audio and video to the mobile device;

wherein the rebroadcasting of the advertising content is delayed until an occurrence of a date or time triggering event.

12. The computer readable medium encoded with computer executable instructions of claim 11, wherein the identifying information is at least one of metadata or identification tag to identify the advertising content to enable targeted advertisements.

13. The computer readable medium encoded with computer executable instructions of claim 11, wherein a rebroadcast is wirelessly transmitting in accordance with an IEEE 802.11 standard.

14. The computer readable medium encoded with computer executable instructions of claim 11, wherein a rebroadcast is wirelessly transmitting in accordance with a Bluetooth standard.

15. The computer readable medium encoded with computer executable instructions of claim 11, wherein a rebroadcast is wirelessly transmitting in accordance with an IEEE 802.15 standard.

* * * * *

UNITED STATES PATENT AND TRADEMARK OFFICE
CERTIFICATE OF CORRECTION

PATENT NO. : 9,633,374 B2
APPLICATION NO. : 13/729795
DATED : April 25, 2017
INVENTOR(S) : Binuraj K. Ravindran and Sridhar G. Sharma Page 1 of 1

It is certified that error appears in the above-identified patent and that said Letters Patent is hereby corrected as shown below:

In the Claims

In Column 8, Line 16, in Claim 3, delete "IEEE" and insert -- Institute of Electrical and Electronics Engineers (IEEE) --, therefor.

In Column 8, Line 22, in Claim 5, delete "IEEE" and insert -- Institute of Electrical and Electronics Engineers (IEEE) --, therefor.

In Column 8, Line 63, in Claim 8, delete "IEEE" and insert -- Institute of Electrical and Electronics Engineers (IEEE) --, therefor.

In Column 9, Line 2, in Claim 10, delete "IEEE" and insert -- Institute of Electrical and Electronics Engineers (IEEE) --, therefor.

In Column 10, Line 16 (approx.), in Claim 13, delete "IEEE" and insert -- Institute of Electrical and Electronics Engineers (IEEE) --, therefor.

In Column 10, Line 24, in Claim 15, delete "IEEE" and insert -- Institute of Electrical and Electronics Engineers (IEEE) --, therefor.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*